(12) United States Patent
Kutliroff et al.

(10) Patent No.: US 10,573,018 B2
(45) Date of Patent: Feb. 25, 2020

(54) THREE DIMENSIONAL SCENE RECONSTRUCTION BASED ON CONTEXTUAL ANALYSIS

(71) Applicant: INTEL CORPORATION, Santa Clara, CA (US)

(72) Inventors: Gershom Kutliroff, Alon Shvut (IL); Shahar Fleishman, Hod Hasharon (IL); Mark Kliger, Modi'in-Macabim-Reut (IL)

(73) Assignee: Intel Corporation, Santa Clara, CA (US)

(*) Notice: Subject to any disclaimer, the term of this patent is extended or adjusted under 35 U.S.C. 154(b) by 15 days.

(21) Appl. No.: 15/209,014

(22) Filed: Jul. 13, 2016

(65) Prior Publication Data
US 2018/0018805 A1 Jan. 18, 2018

(51) Int. Cl.
*G06T 7/60* (2017.01)
*G06T 17/00* (2006.01)
(Continued)

(52) U.S. Cl.
CPC ............ *G06T 7/60* (2013.01); *G06K 9/00671* (2013.01); *G06T 7/33* (2017.01); *G06T 7/50* (2017.01);
(Continued)

(58) Field of Classification Search
CPC ..... G06T 15/00; G06T 7/0028; G06T 7/0051; G06T 7/408; G06T 7/60; G06T 11/60;
(Continued)

(56) References Cited

U.S. PATENT DOCUMENTS 8,488,877 B1* 7/2013 Owechko ........... G06K 9/00704
382/103
8,571,328 B2* 10/2013 Shechtman .......... G06K 9/6211
382/218
(Continued)

OTHER PUBLICATIONS

International Search Report International Patent Application No. PCT/US2017/012543, dated Apr. 20, 2017, 5 pages.
(Continued)

*Primary Examiner* — Brian P Yenke
(74) *Attorney, Agent, or Firm* — Finch & Maloney PLLC

(57) ABSTRACT

Techniques are provided for context-based 3D scene reconstruction employing fusion of multiple instances of an object within the scene. A methodology implementing the techniques according to an embodiment includes receiving 3D image frames of the scene, each frame associated with a pose of a depth camera, and creating a 3D reconstruction of the scene based on depth pixels that are projected and accumulated into a global coordinate system. The method may also include detecting objects, based on the 3D reconstruction, the camera pose and the image frames. The method may further include classifying the detected objects into one or more object classes; grouping two or more instances of objects in one of the object classes based on a measure of similarity of features between the object instances; and combining point clouds associated with each of the grouped object instances to generate a fused object.

20 Claims, 15 Drawing Sheets
(5 of 15 Drawing Sheet(s) Filed in Color)

(51) Int. Cl.

| | |
|---|---|
| *G06T 9/00* | (2006.01) |
| *H04N 13/128* | (2018.01) |
| *H04N 13/257* | (2018.01) |
| *G06T 11/60* | (2006.01) |
| *G06T 7/33* | (2017.01) |
| *G06T 7/90* | (2017.01) |
| *G06T 7/50* | (2017.01) |
| *G06K 9/00* | (2006.01) |
| *H04N 13/271* | (2018.01) |
| *H04N 13/111* | (2018.01) |

(52) U.S. Cl.
CPC .............. *G06T 7/90* (2017.01); *G06T 11/60* (2013.01); *G06T 17/00* (2013.01); *H04N 13/128* (2018.05); *H04N 13/257* (2018.05); *G06T 2207/20021* (2013.01); *G06T 2207/20048* (2013.01); *G06T 2207/20212* (2013.01); *G06T 2207/30244* (2013.01); *G06T 2210/56* (2013.01); *H04N 13/111* (2018.05); *H04N 13/271* (2018.05)

(58) Field of Classification Search
CPC ........... G06T 17/00; G06T 2207/20021; G06T 2207/20048; G06T 2207/20212; G06T 2207/30244; G06K 9/4642; G06K 9/4652; G06K 9/52; G06K 9/6215; G06K 9/6267; H04N 13/0022; H04N 13/0257; H04N 2013/0081
See application file for complete search history.

(56) References Cited

U.S. PATENT DOCUMENTS

| | | | | |
|---|---|---|---|---|
| 8,849,039 | B2* | 9/2014 | Pham | G06T 7/0042 |
| | | | | 382/197 |
| 8,861,840 | B2* | 10/2014 | Bell | G01S 17/89 |
| | | | | 345/582 |
| 8,942,917 | B2* | 1/2015 | Chrysanthakopoulos | |
| | | | | G06K 9/00671 |
| | | | | 701/410 |
| 9,083,960 | B2* | 7/2015 | Wagner | H04N 13/0253 |
| 9,158,971 | B2* | 10/2015 | Gaidon | G06K 9/00711 |
| 9,171,403 | B2* | 10/2015 | Shapira | G06T 17/10 |
| 9,201,499 | B1* | 12/2015 | Chang | G06F 3/011 |
| 9,378,431 | B2* | 6/2016 | Stoeffler | G06K 9/6202 |
| 9,436,987 | B2* | 9/2016 | Ding | G06T 7/00 |
| 9,438,891 | B2* | 9/2016 | Mannion | G06T 17/00 |
| 9,525,862 | B2* | 12/2016 | Benhimane | G06T 17/00 |
| 9,626,737 | B2* | 4/2017 | Frushour | G06T 3/00 |
| 9,639,943 | B1* | 5/2017 | Kutliroff | G06T 7/0051 |
| 9,665,937 | B2* | 5/2017 | Luo | G06T 7/90 |
| 9,699,380 | B2* | 7/2017 | Somanath | H04N 5/23238 |
| 9,779,508 | B2* | 10/2017 | Pradeep | G06T 7/337 |
| 9,858,681 | B2* | 1/2018 | Rhoads | G06T 7/579 |
| 10,360,718 | B2* | 7/2019 | Chernov | H04N 13/221 |
| 2007/0031064 | A1 | 2/2007 | Zhao | |
| 2008/0225044 | A1* | 9/2008 | Huang | G06T 17/00 |
| | | | | 345/420 |
| 2009/0128577 | A1 | 5/2009 | Gloudemans | |
| 2009/0232355 | A1* | 9/2009 | Minear | G06K 9/00201 |
| | | | | 382/103 |
| 2009/0232388 | A1* | 9/2009 | Minear | G06T 3/0075 |
| | | | | 382/154 |
| 2010/0079456 | A1 | 4/2010 | Barth | |
| 2010/0207936 | A1* | 8/2010 | Minear | G06T 7/30 |
| | | | | 345/419 |
| 2010/0289817 | A1 | 11/2010 | Meier | |
| 2011/0116698 | A1 | 5/2011 | Weis | |
| 2011/0194732 | A1* | 8/2011 | Tsuji | G06K 9/00288 |
| | | | | 382/103 |
| 2012/0194644 | A1* | 8/2012 | Newcombe | G06T 7/20 |
| | | | | 348/46 |
| 2012/0195471 | A1 | 8/2012 | Newcombe | |
| 2012/0306876 | A1 | 12/2012 | Shotton | |
| 2013/0170696 | A1* | 7/2013 | Zhu | G06K 9/68 |
| | | | | 382/103 |
| 2013/0181983 | A1* | 7/2013 | Kitamura | G01B 11/24 |
| | | | | 345/419 |
| 2014/0003705 | A1* | 1/2014 | Taguchi | G06T 7/344 |
| | | | | 382/154 |
| 2014/0037189 | A1* | 2/2014 | Ziegler | G06T 17/00 |
| | | | | 382/154 |
| 2014/0105486 | A1 | 4/2014 | Tamaazousti | |
| 2014/0139639 | A1* | 5/2014 | Wagner | G06T 17/00 |
| | | | | 348/46 |
| 2014/0206443 | A1 | 7/2014 | Sharp | |
| 2014/0340489 | A1 | 11/2014 | Medioni | |
| 2015/0006117 | A1* | 1/2015 | Zhang | G06F 17/5004 |
| | | | | 703/1 |
| 2015/0030236 | A1* | 1/2015 | Wilson | G06K 9/00355 |
| | | | | 382/154 |
| 2015/0231490 | A1 | 8/2015 | Graepel | |
| 2015/0262412 | A1 | 9/2015 | Gruber | |
| 2015/0347872 | A1* | 12/2015 | Taylor | G01C 11/06 |
| | | | | 382/224 |
| 2016/0012646 | A1* | 1/2016 | Huang | G06T 5/005 |
| | | | | 345/419 |
| 2016/0171755 | A1 | 6/2016 | Karsch | |
| 2016/0189381 | A1* | 6/2016 | Rhoads | G06T 7/33 |
| | | | | 382/103 |
| 2016/0189419 | A1* | 6/2016 | Fakih | G06T 17/005 |
| | | | | 345/419 |
| 2016/0196659 | A1 | 7/2016 | Vrcelj | |
| 2016/0328856 | A1 | 11/2016 | Mannino et al. | |
| 2016/0343152 | A1 | 11/2016 | Hay et al. | |
| 2017/0046868 | A1* | 2/2017 | Chernov | G06T 7/73 |
| 2017/0084025 | A1* | 3/2017 | Lyu | G06T 7/0012 |
| 2017/0091996 | A1* | 3/2017 | Wei | G06T 17/20 |
| 2017/0126968 | A1* | 5/2017 | Somanath | H04N 13/207 |
| 2017/0228940 | A1 | 8/2017 | Kutliroff | |
| 2017/0243352 | A1* | 8/2017 | Kutliroff | G06T 7/10 |
| 2017/0278231 | A1* | 9/2017 | Narasimha | H04N 17/002 |
| 2017/0341237 | A1 | 11/2017 | Jain et al. | |
| 2017/0345181 | A1* | 11/2017 | Yu | G06T 7/70 |
| 2017/0372489 | A1* | 12/2017 | Tabuchi | G06T 7/62 |
| 2018/0005015 | A1* | 1/2018 | Hou | G01S 13/86 |
| 2018/0189957 | A1* | 7/2018 | Sanchez Bermudez | |
| | | | | G06T 7/187 |
| 2018/0218513 | A1* | 8/2018 | Ho | G06T 7/73 |
| 2019/0088004 | A1* | 3/2019 | Lucas | G06T 15/08 |
| 2019/0138786 | A1* | 5/2019 | Trenholm | G06K 9/00208 |

OTHER PUBLICATIONS

International Search Report International Patent Application No. PCT/US2017/013353, dated Apr. 27, 2017, 5 pages.
Girshick, R. et al., "Rich feature hierarchies for accurate object detection and semantic segmentation", IEEE Conference on Computer Vision and Pattern Recognition (CVPR), 2014, 8 pages.
Krizhevsky, A. et al., "Imagenet Classification with Deep Convolutional Neural Networks", Advances in Neural Information Processing Systems 25 Conference, 2012, 9 pages.
Notice of Allowance in related U.S. Appl. No. 15/046,614 (dated Jan. 4, 2018).
Song, S. et al., "Robot in a room: toward perfect object recognition in closed environment", Jul. 2015, 10 pages, <arXiv:1507.02703>.
Grigorescu, S. et al., "Robust feature extraction for 3D reconstruction of boundary segmented objects in a robotic library scenario", IEEE RSJ International Conference on Intelligent Robots and Systems, Oct. 2010, 8 pages.
Breen, et al., "Interactive Occlusion and Automatic Object Placement for Augmented Reality", Computer Graphics Forum, 1996, vol. 15, 12 pages.
Mian, et al., "Three-dimensional model-based object recognition and segmentation in cluttered scenes", IEEE Transactions on pattern analysis and machine intelligence, Oct. 2006, vol. 28, 18 pages.
Non Final Rejection received in U.S. Appl. No. 15/046,614 (dated Jun. 12, 2017) (16 pages).

(56) References Cited

OTHER PUBLICATIONS

Written Opinion of the International Searching Authority for International Patent Application PCT/US2017/013353, dated Apr. 27, 2017, 8 pages.
Written Opinion of the International Searching Authority for International Patent Application PCT/US2017/012543, dated Apr. 20, 2017, 7 pages.

* cited by examiner

RGB Image Frame
302

Depth Map Frame
304

500

THREE DIMENSIONAL SCENE RECONSTRUCTION BASED ON CONTEXTUAL ANALYSIS

BACKGROUND

There are numerous imaging applications that involve three dimensional (3D) scene reconstruction. These include, for example, augmented reality applications, scene understanding applications, and robotic imaging and navigation applications, to name a few. The increasing availability of lower cost 3D cameras, or "depth cameras," enable the hosting of such applications on a wide variety of platforms including mobile platforms that facilitate image capture from many perspectives. Typically, however, there are at least some regions of the scene that fail to be fully captured or are of relatively poor image quality. This may happen as a result of occlusions, clutter, or poor viewing angles. Additionally, camera and sensor limitations can introduce pixel noise and produce incomplete depth maps. These problems can result in partial scans of objects in the scene, degraded scene reconstruction, and failure of follow on applications, such as scene understanding algorithms, to perform correctly on the reconstructed scene.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
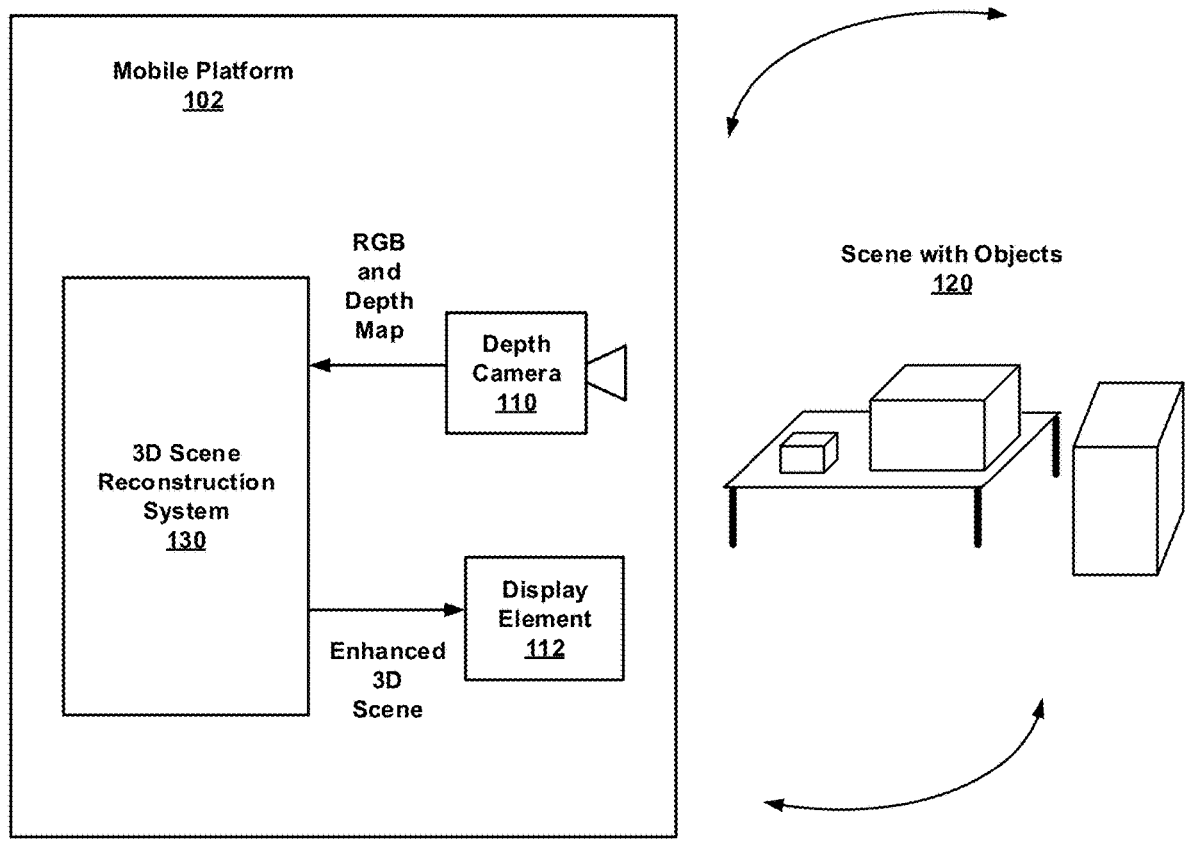
FIG. 1 is a top level block diagram of a system for context-based 3-Dimensional (3D) scene reconstruction, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for context-based 3D scene reconstruction, employing fusion of multiple detected instances of an object within the scene for improved accuracy. The scene may be captured by a sequence of image frames generated, for example, by a depth camera (also known as a 3D camera) or a multi-camera system, from which both color pixels and depth pixels (e.g., a depth map) may be obtained. The scene is imaged from various perspectives, and camera poses are computed for each perspective, from which the 3D reconstruction is generated. The disclosed techniques for fusion of object instances can be used, for example, to fill in gaps or missing data in the image frames, caused by object occlusions, clutter, and/or camera and sensor limitations. The techniques may also correct for imaging errors associated with noisy pixel values and other such problems.

The disclosed techniques provide a capability to recognize that a scene contains multiple instances of an object, for example 2 or more chairs of the same type, and to fuse the image data associated with each instance to create an improved capture of that object. This is useful since each instance of the object is located at a different point in space within the scene and thus each instance will likely provide different and complementary imaging data. For example, an occluded region on one object instance may be filled in with available data from the same region on another instance of that object. Similarly, if some pixels associated with a region of an object are corrupted due to poor lighting or distance, another instance of that object at a different location may be able to provide the missing data. Additionally, the disclosed techniques provide an improvement in the quality of the 3D reconstruction after the images have been captured and an initial scene reconstruction has been generated. In other words, the techniques may operate on existing captured data, augmenting the scene with no requirement for additional image capture.

In accordance with an embodiment, the disclosed techniques can be implemented, for example, in a computing system or an image capture and processing system, or a software product executable or otherwise controllable by such systems. The system or product is configured to scan a scene and capture 3D images from varying perspectives; recognize multiple instances of objects within that scene; and combine or fuse the object instances to improve the representation of each instance of the object. The system may then generate an enhanced 3D reconstruction of the scene, either for presentation to a user, or for follow on processing such as augmented reality applications, scene understanding applications, and robotic imaging and navigation applications.

The techniques described herein may allow for improved scene reconstruction, compared to existing methods that operate on noisy and incomplete image and depth data, particularly from lower cost cameras and sensors, according to an embodiment. Additionally, these disclosed techniques, which can compensate for lower image quality from less expensive cameras, can be implemented on a broad range of computing and communication platforms, including mobile devices, as depth cameras are becoming increasingly available on such platforms at lower costs. These techniques may further be implemented in hardware or software or a combination thereof.

FIG. 1 is a top level block diagram 100 of a system for context-based 3-Dimensional (3D) scene reconstruction, configured in accordance with certain embodiments of the present disclosure. A platform 102 is shown to include a depth camera 110, a display element 112, and a 3D scene reconstruction system 130. In some embodiments, the platform 102 may be a mobile platform such as, for example, a tablet, a smartphone, or other such similar device. The depth camera may be configured as a rear mounted camera on the platform to facilitate scanning of the scene 120 as the user moves with respect to the scene to capture 3D image frames from multiple perspectives or camera poses. In some embodiments, the depth camera is configured to capture a stream of images at a relatively high frame rate, for example 30 frames per second or more. The captured images may be presented to the user, for example on display element 112, to provide feedback on the process. Each 3D image frame may comprise a color image frame that provides color (e.g., red, green and blue or RGB) pixels, and a depth map frame that provides depth pixels. The scene 120 may include one or more objects of interest, some of which may be positioned or otherwise resting on surface planes, such as tables, shelves or the floor.

At a top level, the 3D scene reconstruction system 130 may be configured to generate a 3D reconstruction of the scene comprising points in 3D space corresponding to structures or objects within the scene. In accordance with an embodiment, the 3D scene reconstruction system 130 is configured to recognize objects within the scene as belonging to a class of objects, and to further recognize multiple instances of those objects appearing within the scene, thus enabling fusion of the data associated with each instance, to fill gaps and improve reconstruction accuracy, as will be explained in greater detail below. In some embodiments, the resulting 3D reconstructed scene may also be presented to the user on display element 112.

Figure 2:
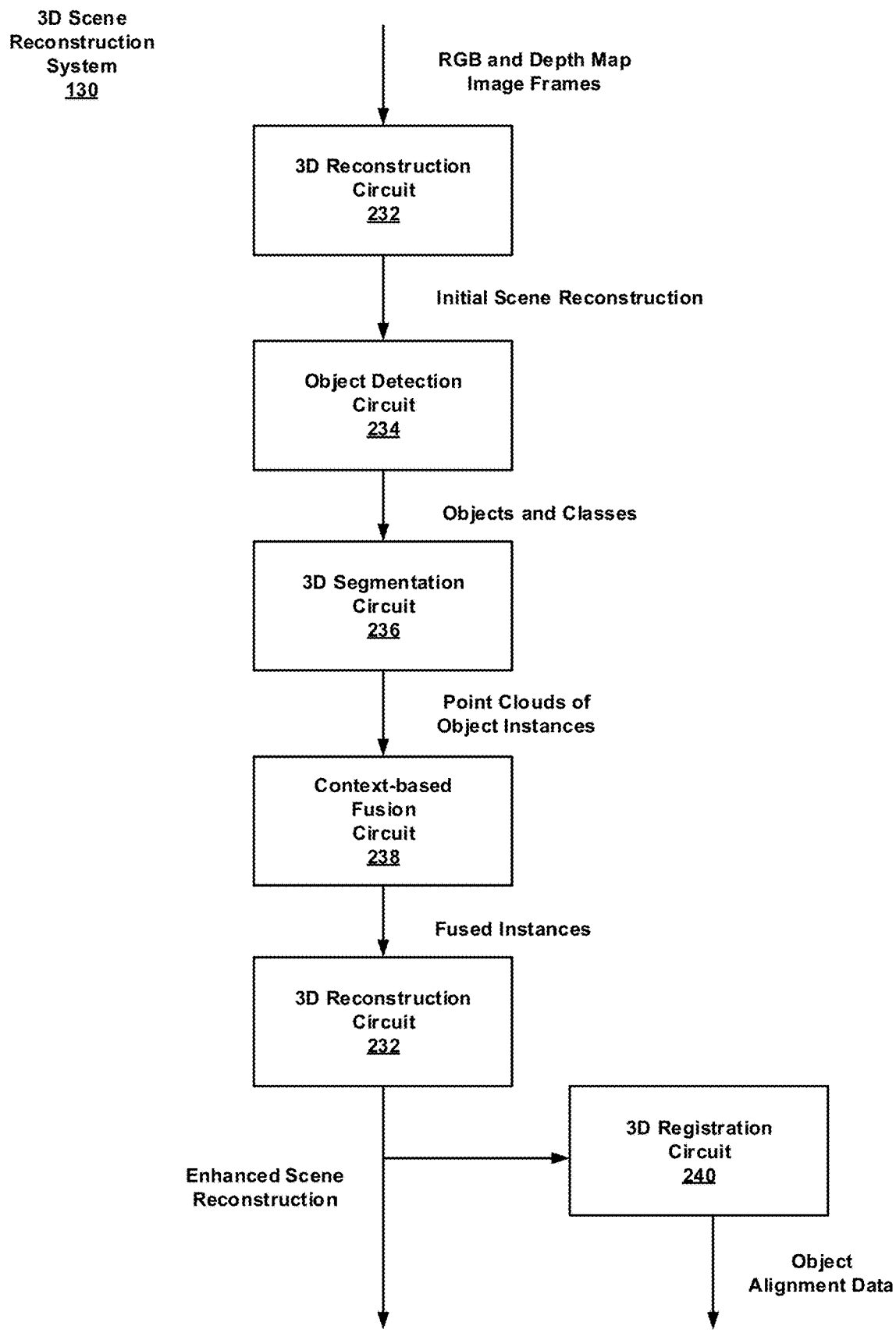
FIG. 2 is a more detailed block diagram of the 3D scene reconstruction system, configured in accordance with certain embodiments of the present disclosure.

FIG. 2 is a more detailed block diagram of the 3D scene reconstruction system 130, configured in accordance with certain embodiments of the present disclosure. The 3D reconstruction system 130 is shown to include a 3D reconstruction circuit 232, an object detection circuit 234, a 3D segmentation circuit 236, a context-based fusion circuit 238, and a 3D registration circuit 240, the operations of which will be explained in greater detail below in connection with the following figures.

Figure 3:
FIG. 3 illustrates an example color image and depth map, in accordance with certain embodiments of the present disclosure.
Figure 3:
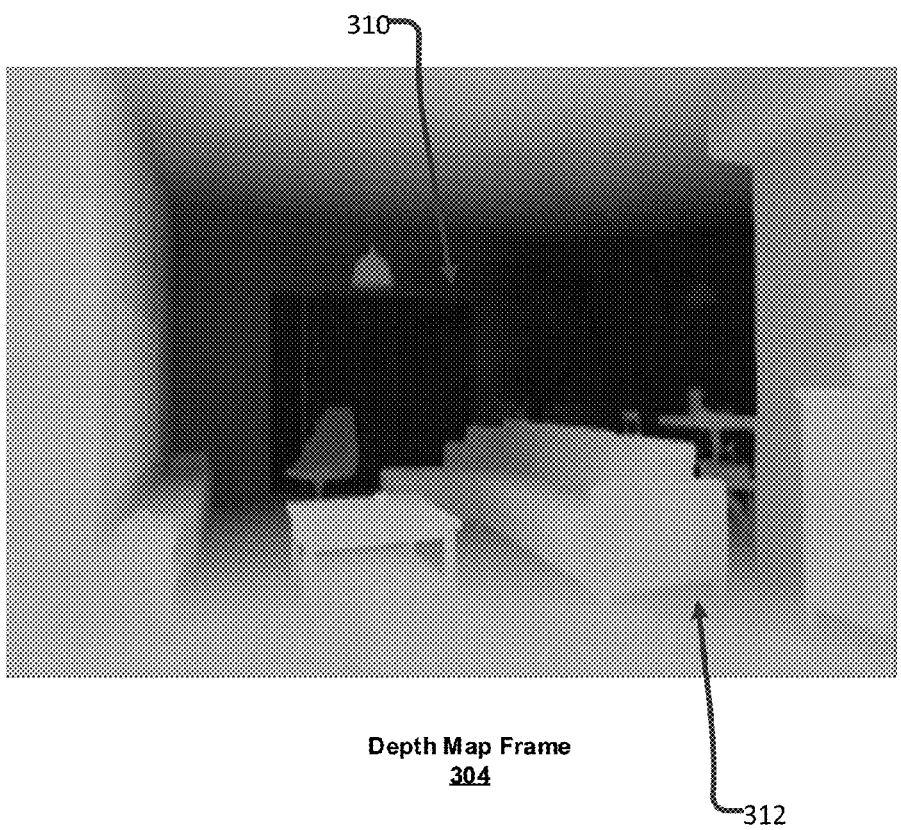

FIG. 3 illustrates an example color image and depth map, as may be provided by depth camera 110, in accordance with certain embodiments of the present disclosure. An RGB image frame 302 is shown alongside a corresponding depth map frame 304 of a scene of a furnished room provided by the depth camera. The scene, for which a context-based 3D reconstruction is desired, includes a variety of objects such as a table, lamp, sofa, etc.,. The RGB frame 302 captures color data represented by RGB pixels of the image, although other color schemes are possible such as luminance/chrominance (also referred to as YUV). In the depth map frame 304, each pixel represents the distance between that region of the scene and the camera. This can be done through the intensity value of each pixel. In the depth map frame 304, for example, the pixel indicates proximity to the camera. In particular, regions with darker (more intense) pixels 310 are relatively far from the camera, while lighter (less intense) pixels 312 are closer. In addition, the operational parameters of the camera, such as focal length and principal axis, are known or provided so that each depth pixel can be projected into a 3D position in the scene relative to the camera. Furthermore the RGB and depth components of the camera may be calibrated, both spatially and temporally, to improve the accuracy of the RGB values and the depth values of each individual pixel.

Figure 4:
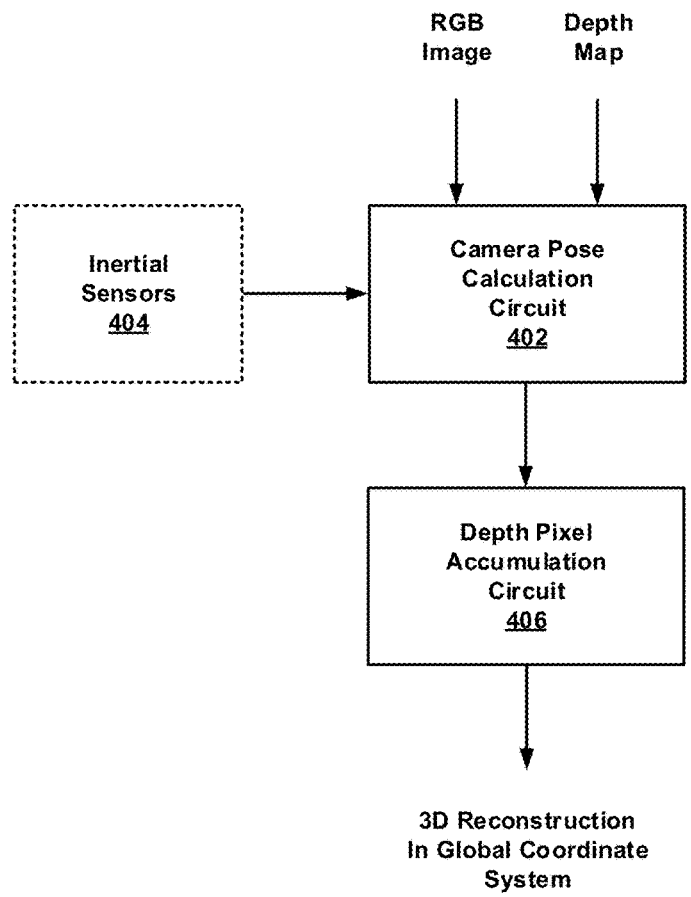
FIG. 4 is a more detailed block diagram of a 3D reconstruction circuit, configured in accordance with certain embodiments of the present disclosure.
Figure 5:
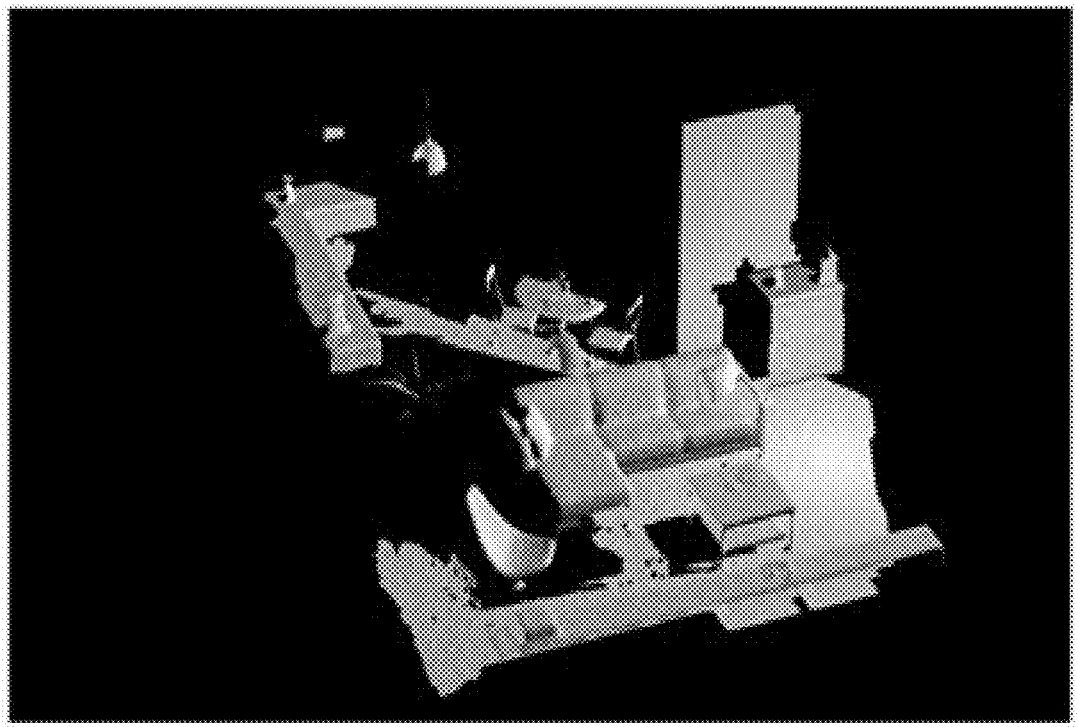
FIG. 5 illustrates an example of a 3D scene reconstruction, in accordance with certain embodiments of the present disclosure.

FIG. 4 is a more detailed block diagram of a 3D reconstruction circuit 232, configured in accordance with certain embodiments of the present disclosure. The reconstruction circuit is shown to include a camera pose calculation circuit 402, a depth pixel accumulation circuit 406 and, in some embodiments, inertial sensors 404 such as, for example, a gyroscope and/or an accelerometer. An example rendering 500 of a 3D reconstruction of the scene shown in FIG. 3 is illustrated in FIG. 5. This 3D reconstruction is composed of a relatively large number of points in 3D space, corresponding to structures within the scene, and may be represented in one of several ways including, for example, a signed distance function in a volumetric structure, or, equivalently, a polygonal mesh. A 3D reconstruction of a scene generally includes at least two operations: calculation of the camera pose, and accumulation of the depth pixels into a global coordinate system. The 3D reconstruction circuit 232 is configured to perform an initial reconstruction and an enhanced reconstruction. The initial reconstruction is based on the RGB and depth frames received from the camera. A second enhanced reconstruction of the scene is performed after fused object instances are generated and substituted into the scene, as will be described in greater detail below.

As new RGB and depth frames of the scene 120 are captured by depth camera 110 they are provided to the camera pose calculation circuit 402. The camera pose calculation circuit 402 is configured to compute and update the position and orientation (or pose) of the camera. The calculated pose of the camera is the 3D transformation from the position and orientation of the camera in a previous frame, to its position and orientation in the current frame. Three parameters may describe the translation of the camera between consecutive frames (e.g., x, y and z). Three additional parameters may describe the change in orientation (e.g., yaw, pitch and roll angle) for a total of six degrees of freedom (6DOF) that are computed to determine the updated pose of the camera relative to its pose in the previous frame. Determination of the camera pose for each frame can be used to establish a global coordinate system, consistent across all captured frames, in which the 3D points extracted from the depth map can be projected and accumulated by depth pixel accumulation circuit 406. The calculation of the camera pose may be performed in real-time.

In some embodiments, the camera pose may be calculated using an RGB-based Simultaneous Localization and Mapping (SLAM) algorithm which is configured to extract feature descriptors from each RGB frame, match corresponding features across multiple frames and calculate the 6DOF camera pose for each frame through triangulation. Alternatively, data from inertial sensors 404, such as gyroscopes and accelerometers, may be used, either independently, or in combination with the results of the RGB SLAM technique to obtain a more robust estimate of the camera pose.

In some embodiments, the calculation of the camera pose may be based on the depth maps. An Iterative Closest Point algorithm (ICP) can be applied to successive depth maps captured by the camera, to align two sets of point clouds and compute the transformation between them. As will be appreciated, point cloud data is effectively provided by the imaging device by virtue of the depth map. Assuming the two point cloud sets from successive frames represent static scenes, the computed transformation describes the movement of the camera that captured the two point cloud sets. By computing the camera transformation describing successive point cloud frames, the global camera pose for each frame can be computed, and the associated point clouds can be accumulated (by depth pixel accumulation circuit 406) into a single data structure representing the 3D reconstruction of the entire scene. By repeating this process for each successive depth frame captured by the camera, each point in the scene is effectively sampled multiple times, and consequently, a weighted average of their 3D positions can be computed, generating a higher quality 3D reconstruction of the scene. Furthermore, the segmentation techniques described below, which rely on depth data, may operate directly on the depth maps provided by the camera or on the 3D reconstruction based on aligning successive depth frames and averaging the 3D positions of the accumulated points. In some embodiments, the camera pose may be estimated using other known techniques in light of the present disclosure.

The camera pose calculation circuit 402 determines the 3D position of the camera at each frame, in a global coordinate system. Consequently, 3D points extracted from the associated depth maps can also be transformed or projected to this coordinate system. Thus, computation of the camera pose for each frame allows for integration of the depth maps obtained at different times into a single 3D space. Each camera frame also includes an RGB image, which may similarly be associated with the 6DOF camera pose.

Figure 6:
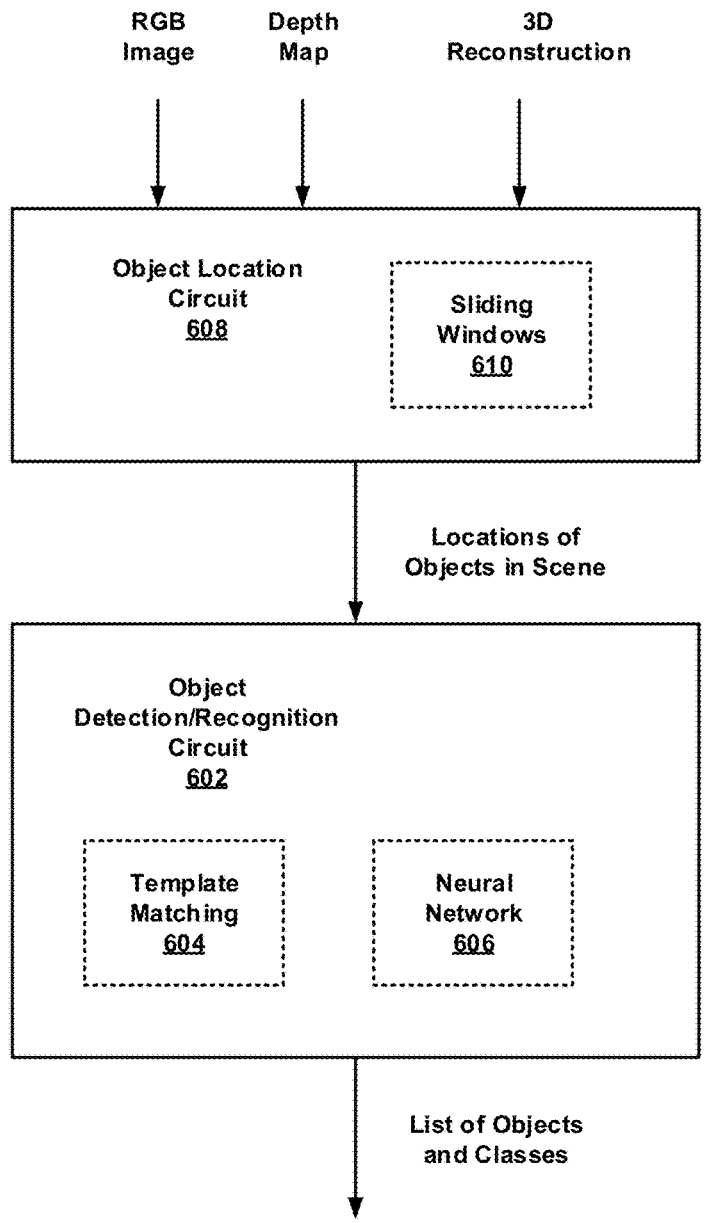
FIG. 6 is a more detailed block diagram of an object detection circuit, configured in accordance with certain embodiments of the present disclosure.

FIG. 6 is a more detailed block diagram of an object detection circuit 234, configured in accordance with certain embodiments of the present disclosure. The object detection circuit is shown to include an object location circuit 608 and an object detection/recognition circuit 602.

The object location circuit 608 is configured to determine a location of each object in the scene. Determination of the location of the object in the image may be accomplished using sliding windows 610 that can be applied progressively over the image, cropping smaller regions of the image and applying the neural network (described below) to each window. Other techniques for object location first filter out and reject those windows that are unlikely to contain objects. Importantly, these methods are generally invariant to viewing angles so that the same object, and its corresponding 2D location, can be detected from multiple camera poses.

The object detection/recognition circuit 602 is configured to process the RGB image, and in some embodiments the associated depth map as well, along with the 3D reconstruction, to generate a list of any objects of interest recognized in the image. Any suitable object detection technique may be used in to recognize the objects in the scene, and compute their locations in the image including, for example, template matching 604 or classification using a bag-of-words vision model. In some embodiments, deep learning methods, and, in particular, convolutional neural networks 606 are employed by the detection circuit 602. The 3D Reconstruction and/or the depth maps may also be used as additional channels in a deep convolutional network for the purpose of the object recognition and detection. Some neural network techniques process an input image and calculate a probability that a given object is present in the image. For example, a convolutional neural network (CNN), with a final Softmax fully connected layer, generates a probability distribution over all of the input object classes. Object classes that are assigned a probability which exceeds a threshold value are considered to be recognized as present in the image. In some embodiments, the CNN solution may be biased towards selecting multiple instances of a particular class by lowering the threshold once a class is initially recognized. For example, the thresholds for each object class are initially assigned default values, but when a particular class is detected within a given scene, the threshold value for that class is updated to a lower value, corresponding to the increased likelihood that it will appear again in the same scene. For example, if an object is recognized as belonging to the "chair" class, the threshold for that class is lowered to make it more likely that a second instance of a chair in the scene will be classified as a chair, so that both chairs may later be grouped together for object fusion, as described below.

Figure 7:
FIG. 7 illustrates an example of detected objects in a 3D image, in accordance with certain embodiments of the present disclosure.

FIG. 7 illustrates an example of detected objects in an RGB image corresponding to the captured 3D scene, in accordance with certain embodiments of the present disclosure. The detected and recognized objects in an RGB image of the scene, associated with one camera pose, are shown including for example the lamp 710.

Figure 8:
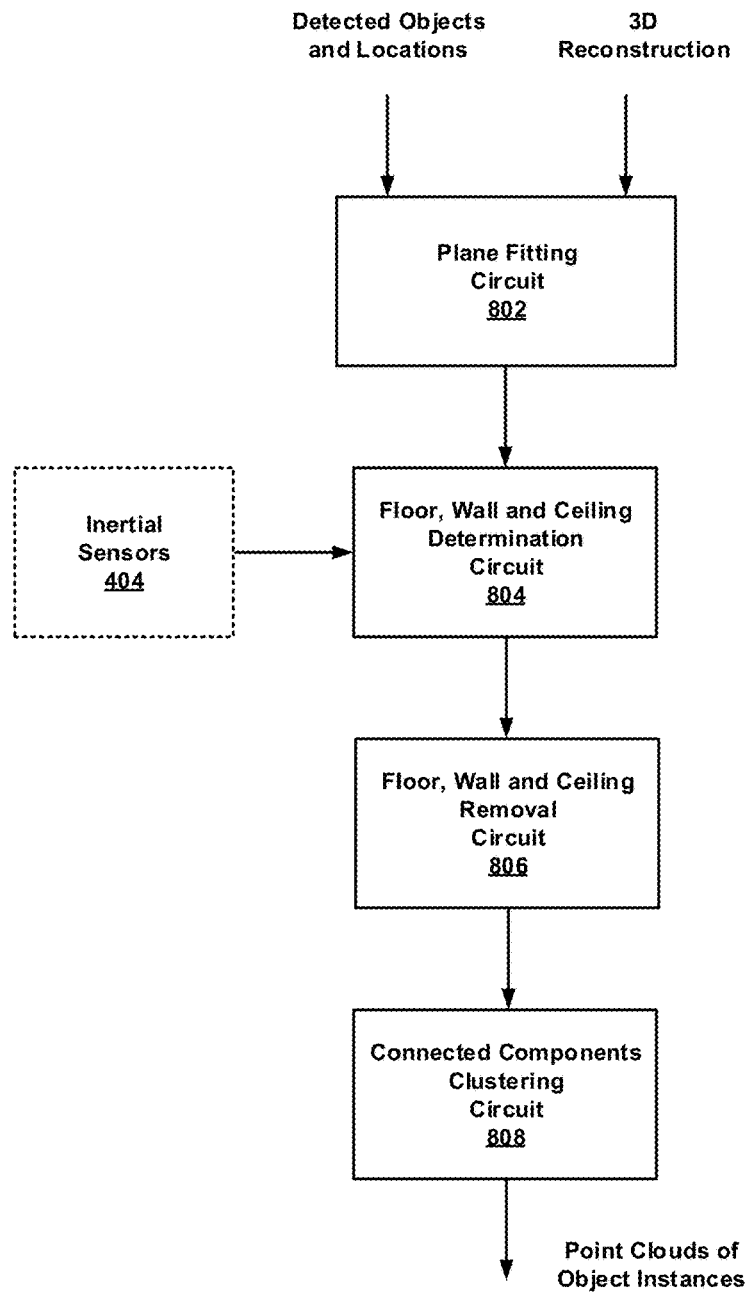
FIG. 8 is a more detailed block diagram of a 3D segmentation circuit, configured in accordance with certain embodiments of the present disclosure.

FIG. 8 is a more detailed block diagram of a 3D segmentation circuit 236, configured in accordance with certain embodiments of the present disclosure. The segmentation circuit is shown to include a plane fitting circuit 802, a floor/wall/ceiling determination circuit 804, a floor/wall/ceiling removal circuit 806, and a connected components clustering circuit 808. The 3D segmentation circuit 236 is configured to segment out each of the objects detected by the object detection circuit 234, by finding the points of the 3D reconstruction that correspond to the contours of the objects. To this end, recall that each object captured by a 3D camera in a given image is associated with a point cloud, and that point cloud is represented by a set of points included in the depth map provided by the 3D camera. As will be appreciated in light of this disclosure, two or more objects detected in a scene, which are grouped together based on a measure of similarity of features, can be fused by combining point clouds associated with each of the detected objects.

The plane fitting circuit 802 is configured to scan the 3D reconstruction of the scene for planar surfaces. One method to accomplish this is to calculate normal vectors to the surfaces by scanning the depth maps and calculating the cross product of differences of neighboring depth pixels. The normal vectors are then clustered into groups based on spatial proximity and the values of the vectors. Next, a plane is fitted to each cluster. Specifically, the equation for the plane, in an x, y, z coordinate system, may be expressed as:

$$ax+by+cz+d=0$$

where the constants a, b, c, d which define the plane may be calculated by a least-squares fit or other known techniques in light of the present disclosure.

Floor/wall/ceiling determination circuit 804 is configured to identify floors, walls and ceilings from the list of planes detected in the scene. In some embodiments, a gyroscope inertial sensor 404 is employed to detect the direction of gravity during scanning, and this data is stored during the scanning process. The direction of gravity may then be used to find the plane corresponding to the floor. Next, planar surfaces that are perpendicular to the floor plane (within a margin of error) and cover a sufficiently large region of the scene are identified as walls. Planar surfaces that are perpendicular to the walls and/or parallel to the floor and cover a sufficiently large region of the scene are identified as the ceiling. Floor/wall/ceiling removal circuit 806 is configured to remove points that are located within a relatively small distance from one of these planar surfaces from the scene. Connected components clustering circuit 808 is configured to generate clusters of pixels that are not connected to other regions and classify them as individual, segmented objects of the scene. Recall that each segmented object can be represented by a corresponding point cloud.

Figure 9:
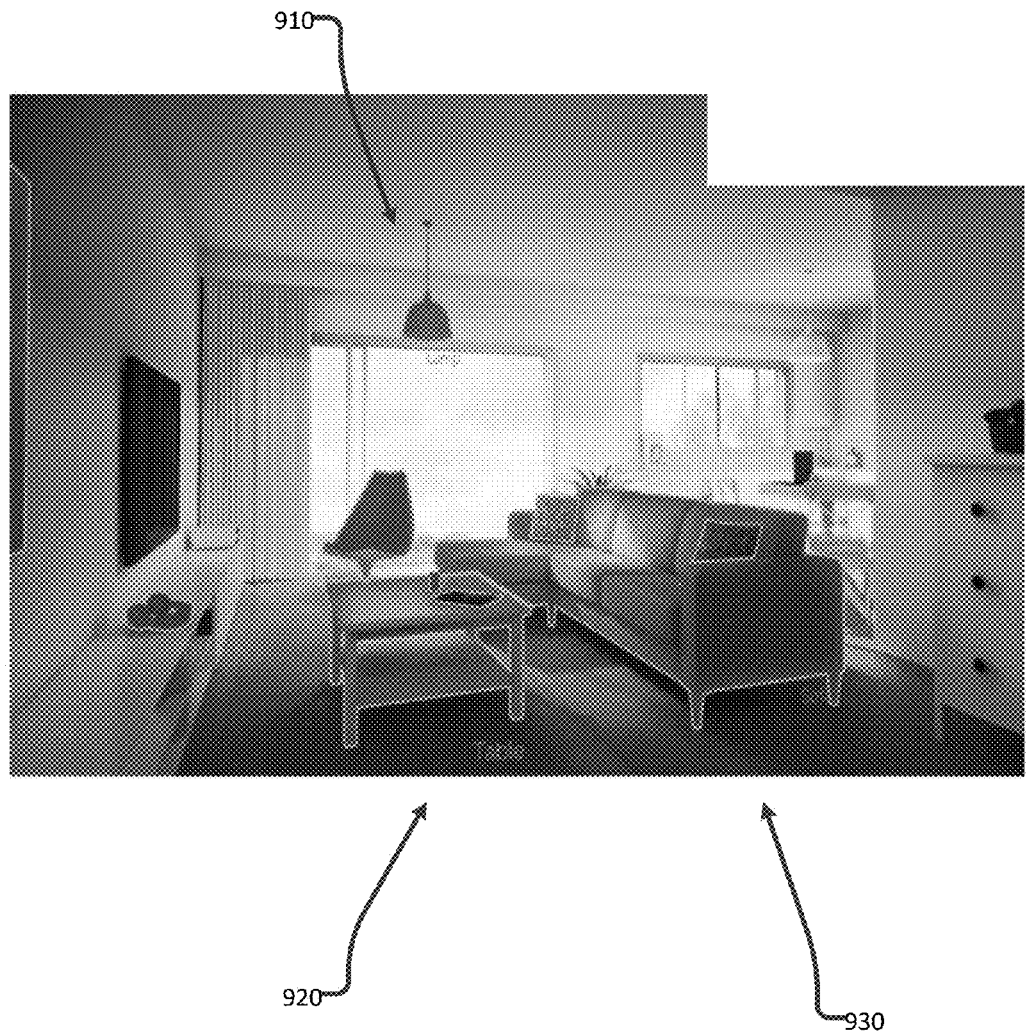
FIG. 9 illustrates an example of segmented objects in a 3D image, in accordance with certain embodiments of the present disclosure.

FIG. 9 illustrates an example of segmented objects in an RGB image corresponding to the captured 3D scene, in accordance with certain embodiments of the present disclosure. Here, the same furnished room is shown as in FIG. 3, but the detected objects (e.g., lamp 910, table 920, sofa 930, etc.) have been marked with boundaries (in blue) to represent the result of the segmentation process described herein. More specifically, the segmentation process generates, for each object of interest, a collection of 3D points, referred to as an object boundary set, representing the 3D boundary or contour of the object of interest. Note that the collection of 3D points can be a sub-set of the points included in the point cloud corresponding to that object.

Figure 10:
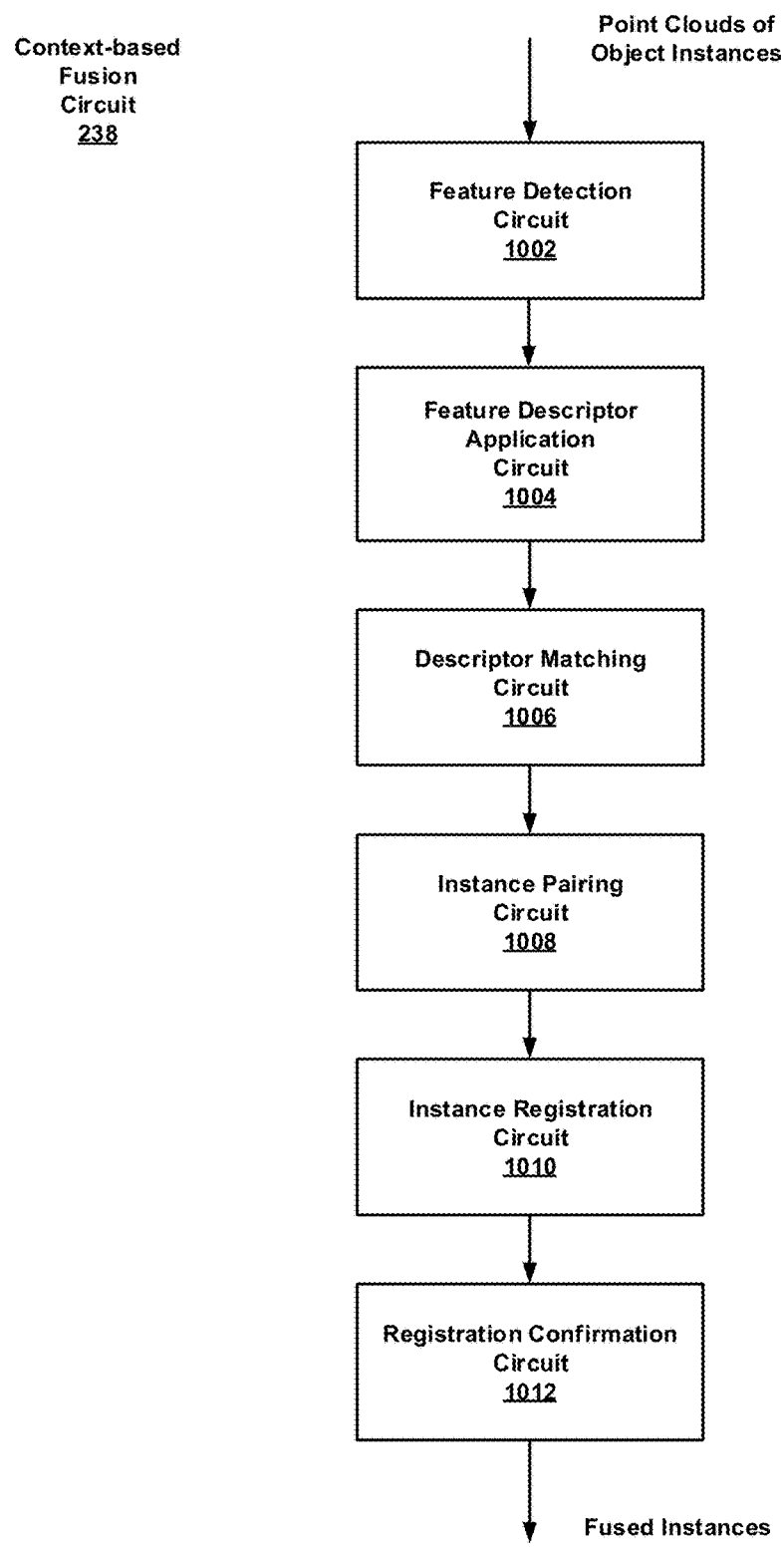
FIG. 10 is a more detailed block diagram of a context-based fusion circuit, configured in accordance with certain embodiments of the present disclosure.

FIG. 10 is a more detailed block diagram of a context-based fusion circuit 238, configured in accordance with certain embodiments of the present disclosure. The context-based fusion circuit is shown to include a feature detection circuit 1002, a feature descriptor application circuit 1004, a descriptor matching circuit 1006, an instance pairing circuit 1008, an instance registration circuit 1010, and a registration confirmation circuit 1012. At a high level, two or more instances of objects in a scene, which are in the same object class and have been grouped together based on a measure of similarity of features, are fused by combining point clouds associated with each of the object instances.

In more detail, feature detection circuit 1002 is configured to detect features associated with surfaces of each object instance. The features, which are also referred to as "keypoints," may be 3D features that include, for example, surface variation, results of application of a min-max operator on panoramic range-images, or results of application of a 3D Harris detector. In some embodiments, the features may also include 2D features such as, for example, Harris corners or results of application of a Scale Invariant Feature Transform. Any combination of suitable 3D and/or 2D may be employed, in light of the present disclosure.

Feature descriptor application circuit 1004 is configured to apply feature descriptors to the detected features in each of the object instances. The feature descriptors may include, for example, Spin-Images, 3D Speeded-Up Robust Feature descriptors, Point Feature Histograms, or a Histogram of Oriented Gradients. Descriptor matching circuit 1006 is configured to match descriptors between each of the object instances.

Instance pairing circuit 1008 is configured to pair two object instances that have the greatest number of descriptor matches. A large number of matches indicate that the two instances are good candidates to be fused together, since they share a large overlapping region.

Instance registration circuit 1010 is configured to register the paired object instances by computing a rigid transformation that maps shared overlapping regions between the paired object instances. The registration may be performed by known techniques, such as Random Sample Consensus (RANSAC) and an Iterative Closest Point (ICP), in light of the present disclosure.

Registration confirmation circuit 1012 is configured to validate the registration of the paired object instances by calculating a distance between the matched descriptors of the paired object instances and comparing the distance to a threshold value. The registration of the two instances is verified as successful by comparing the Euclidean distances between the matched descriptors. If the distance is less than a pre-selected threshold, the registration is considered successful, and the two instances may be treated as a single fused instance with a greater number of data points. If the registration fails, these two instances are marked as incompatible.

In some embodiments, the process may be iterated. For example, features are detected on the newly created fused object instance, and the process repeats in order to fuse additional instances together. The process may repeat until all of the instances have been fused, or the remaining possible matches have been marked as incompatible. The output of the context-based fusion circuit is a set of accumulated fused data points, comprising the transformed object instances, providing a more complete representation of the object.

The 3D reconstruction circuit 232 may be configured to perform a second, enhanced 3D reconstruction of the scene based on the fused object instances.

Figure 11:
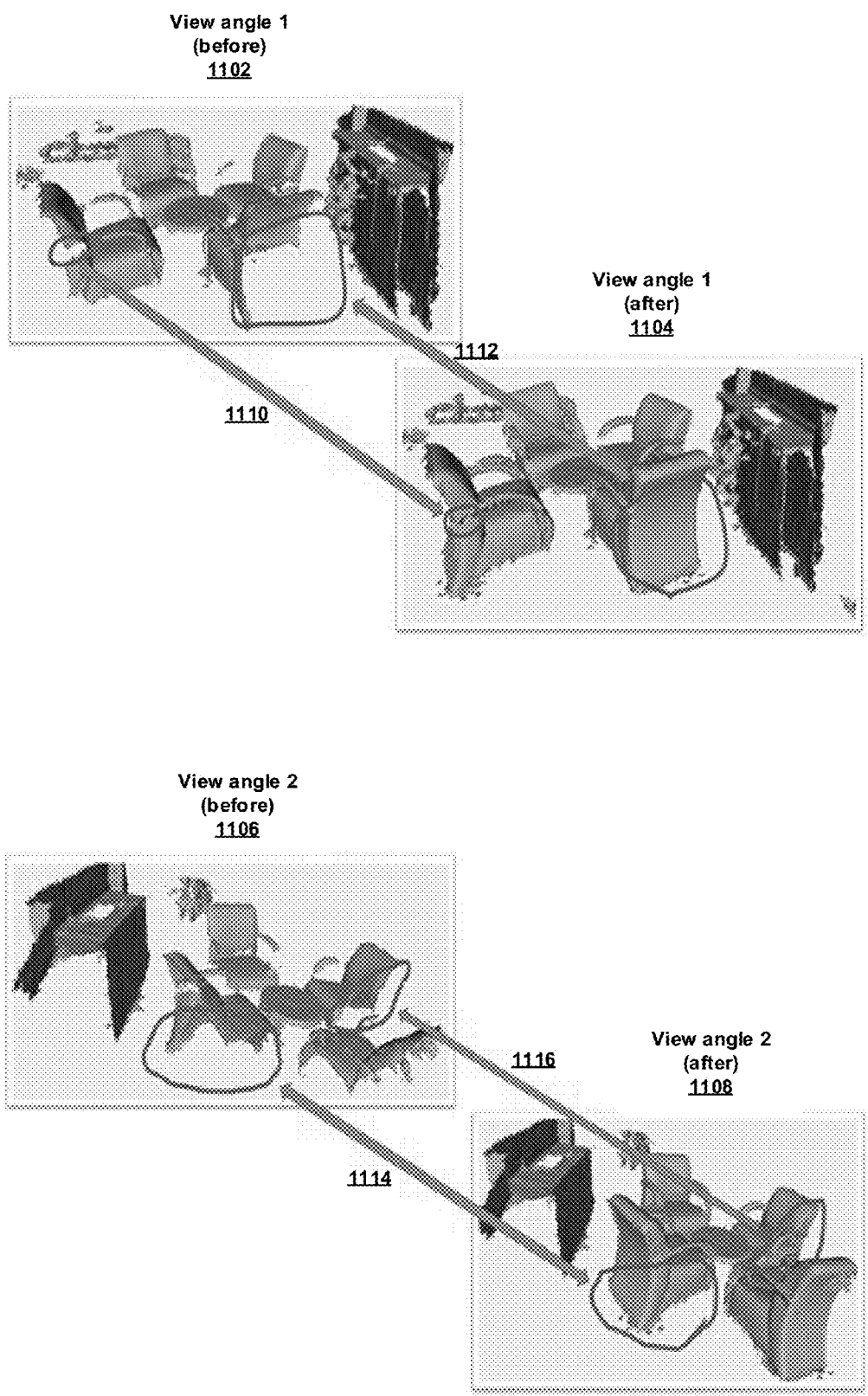
FIG. 11 illustrates an example of context-based fusion of objects, in accordance with certain embodiments of the present disclosure.

FIG. 11 illustrates an example of context-based fusion of objects, in accordance with certain embodiments of the present disclosure. A rendering of a 3D reconstruction from a first viewing angle is shown before object fusion 1102 (initial reconstruction) and after object fusion 1104 (enhanced reconstruction). There are 4 instances of the same chair distributed throughout the scene. As can be seen in 1102, there are gaps in the data for each chair instance. After object fusion, however, the gaps have been filled. In particular, the back of the chair 1112 and the side of the chair 1110 have been reconstructed from the fused instances. Similar before and after results are illustrated from another viewing angle in 1106 and 1108 respectively. Again, various parts of the chairs 1114, 1116 have been reconstructed from object fusion. The poor quality of the original image scans would result in failure of the 3D registration and any subsequent scene understanding applications, so the enhanced 3D reconstruction may be used to provide more than just aesthetic improvement.

Figure 12:
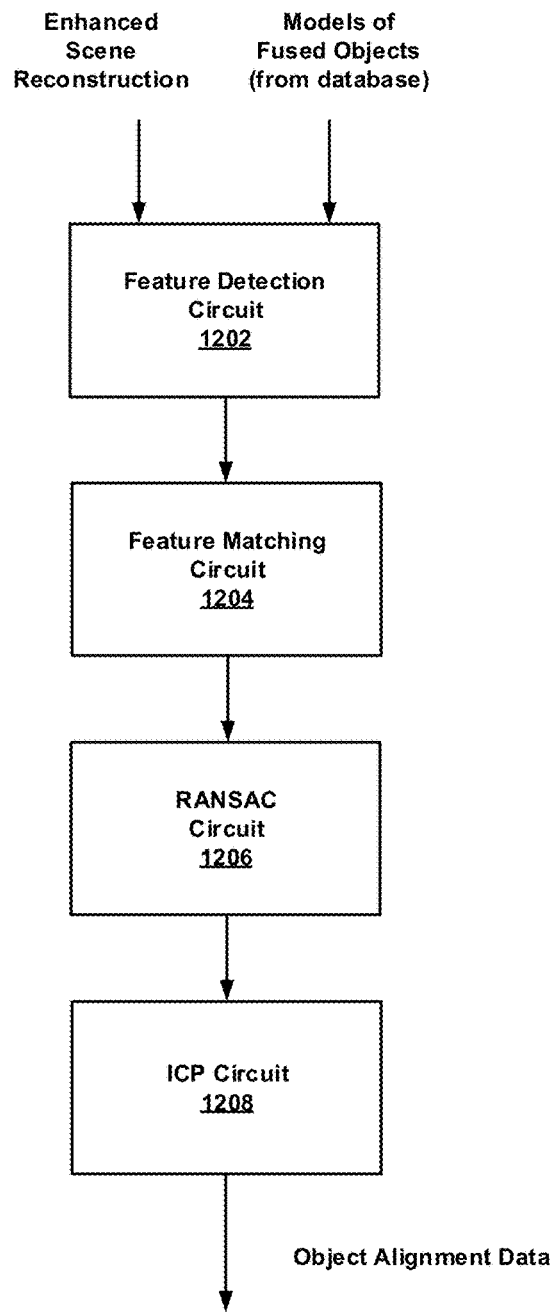
FIG. 12 is a more detailed block diagram of a 3D registration circuit, configured in accordance with certain embodiments of the present disclosure.

FIG. 12 is a more detailed block diagram of a 3D registration circuit 240, configured in accordance with certain embodiments of the present disclosure. The registration circuit is shown to include a feature detection circuit 1202, a feature matching circuit 1204, a Random Sample Consensus (RANSAC) circuit 1206 and an Iterative Closest Point (ICP) matching circuit 1208. The 3D registration circuit 240 is configured to operate on each of the fused objects in the scene, along with the associated segmented region, to obtain a 3D alignment (in pose, orientation, and scale) of the fused object in the scene. In particular, a 3D transformation is computed to align the fused object to a source object, such as, for example a CAD model of the fused object. In some embodiments, the 3D registration may be rigid or non-rigid. In some embodiments, the 3D registration may deform each vertex of the model in order to align more closely with the data in the scene.

Feature detection circuit 1202 is configured to detect features in both the fused objects and the source objects (models). These features may include, for example, 3D corners or any other suitable distinctive features of the fused object. In some embodiments, the feature detection circuit 1202 may be the same (in whole or in part) as feature detection circuit 1002, used in the context-based fusion circuit 238, described previously. In some embodiments, the RGB image frames are stored and mapped to the 3D reconstruction, enabling the use of 2D feature detection techniques such as Scale Invariant Feature Transform (SIFT) detection and Speeded-Up Robust Feature (SURF) detection. Feature matching circuit 1204 is configured to match a subset of at least 3 pairs of features from the fused and source objects to each other. These 3 matches are used to generate a 3D transformation that aligns the fused and source objects. Because some of the matches may be incorrect, and the object data set may be noisy and/or missing some points, the RANSAC circuit 1206 is configured to iteratively improve the 3D transformation alignment. An approximate 3D transformation, generated by the RANSAC circuit 1206 is applied to the source object, and the Iterative Closest Point (ICP) circuit 1208 is configured to further improve or refine the computation of the 3D transformation.

Figure 13:
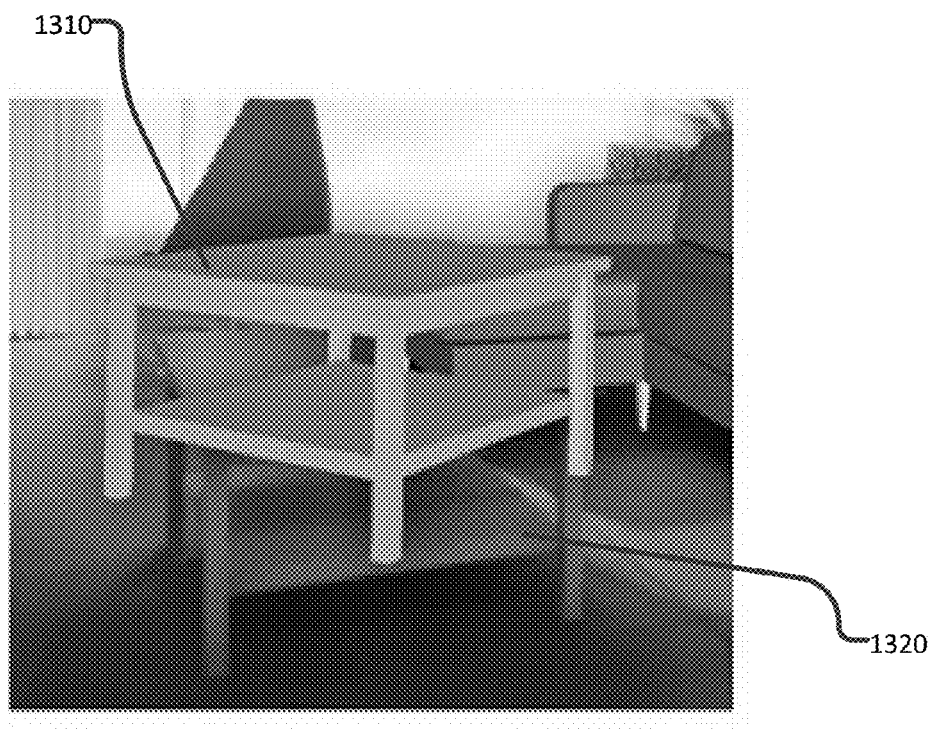
FIG. 13 illustrates an example of a 3D registration of an object, in accordance with certain embodiments of the present disclosure.

FIG. 13 illustrates an example 1300 of a 3D registration of a fused object, in accordance with certain embodiments of the present disclosure. A model of a coffee table 1310 is shown at a point in progress during alignment with the coffee table 1320 of the scene illustrated in FIG. 3. The 3D registration is applied between the model retrieved from the database and the fused result of the context-based reconstruction, since the additional data contained in the fused result enables the registration process to converge more quickly and more accurately. Similarly, the fused result is also used to select a model from the database with which to perform the 3D registration.

Methodology

Figure 14:
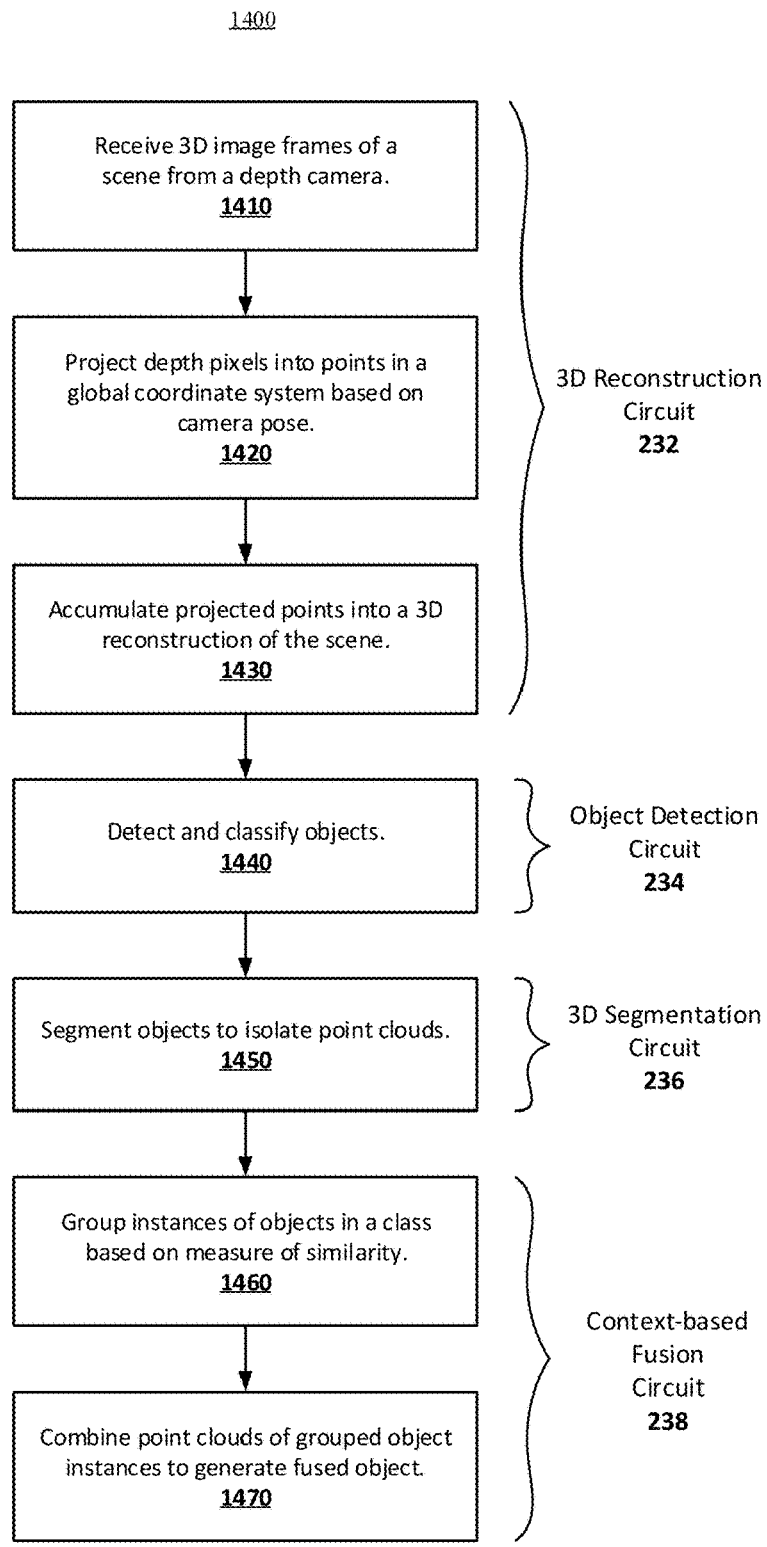
FIG. 14 is a flowchart illustrating a methodology for context-based 3D scene reconstruction, in accordance with certain embodiments of the present disclosure.

FIG. 14 is a flowchart illustrating an example method 1400 for context-based 3D scene reconstruction, in accordance with certain embodiments of the present disclosure. As can be seen, example method 1400 includes a number of phases and sub-processes, the sequence of which may vary from one embodiment to another. However, when considered in the aggregate, these phases and sub-processes form a process for context-based 3D scene reconstruction in accordance with certain of the embodiments disclosed herein. These embodiments can be implemented, for example using the system architecture illustrated in FIGS. 2, 4, 6, 8, 10, and 12 described above. However other system architectures can be used in other embodiments, as will be apparent in light of this disclosure. To this end, the correlation of the various functions shown in FIG. 14 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 1400. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 14, in one embodiment, method 1400 for context-based 3D scene reconstruction commences by receiving, at operation 1410, a series of 3D image frames, for example from a depth camera, of a scene containing one or more objects as the camera scans the scene. Each frame may thus provide a new view of the scene from a different perspective or camera pose. Each frame provided by the depth camera may include a color image frame comprising color (RGB) pixels and a depth map frame comprising depth pixels. Next, at operation 1320, the depth pixels are projected into points in a global coordinate system based on the camera pose, and at operation 1330, the projected points are accumulated into a 3D reconstruction of the scene.

At operation 1440, objects within the scene are detected for each 3D image frame, based on the camera pose, the 3D reconstruction, the RGB image frame and the depth map frame. The objects are also recognized and classified into one or more object classes, for example a chair or a table. At operation 1450, the detected objects are subjected to a segmentation process to isolate the corresponding point cloud for each object that can be used in the subsequent fusion process. At operation 1460, two or more instances of objects, in an object class, are grouped together based on a measure of similarity of features between the object instances. For example, two objects in the "chair" class are determined to be two instances of the same type of chair in the scene, and are thus grouped together. At operation 1470, the grouped object instances are fused by combining point clouds associated with each of the object instances.

Of course, in some embodiments, additional operations may be performed, as previously described in connection with the system. For example, the grouping operation may further include: detecting features associated with surfaces of each object instance; applying feature descriptors to the detected features; matching descriptors between the object instances; and pairing a first object instance with a second object instance, where the first and second object instances have the greatest number of descriptor matches. Further additional operations may include generating an updated 3D reconstruction of the scene based on the fused objects.

Example System

Figure 15:
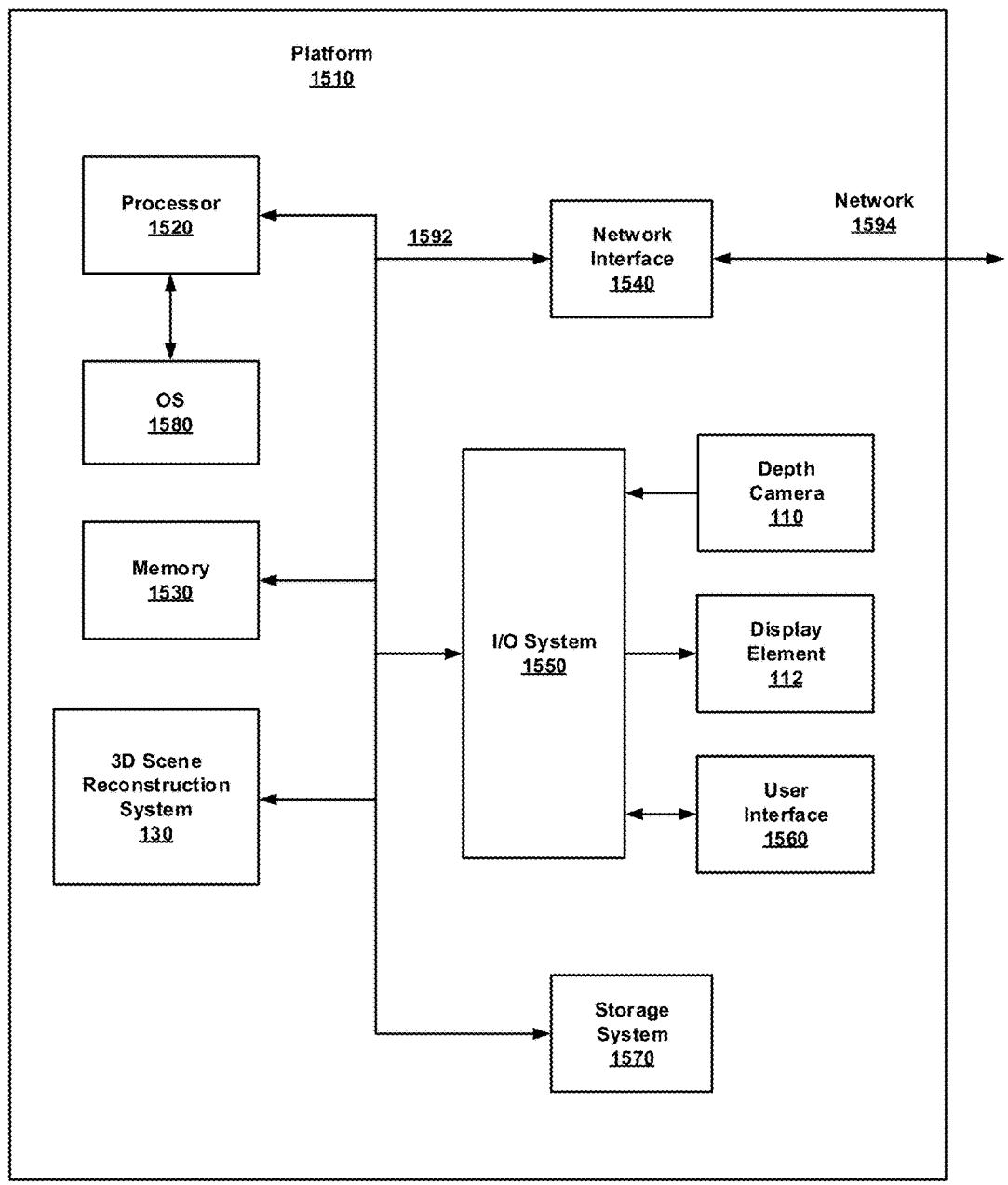
FIG. 15 is a block diagram schematically illustrating a system platform to perform context-based 3D scene reconstruction, configured in accordance with certain embodiments of the present disclosure.

FIG. 15 illustrates an example system 1500 to perform context-based 3D scene reconstruction, configured in accordance with certain embodiments of the present disclosure. In some embodiments, system 1500 comprises a platform 1510 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1510 may comprise any combination of a processor 1520, a memory 1530, 3D scene reconstruction system 130, a network interface 1540, an input/output (I/O) system 1550, a depth camera 110, a display element 112, a user interface 1560 and a storage system 1570. As can be further seen, a bus and/or interconnect 1592 is also provided to allow for communication between the various components listed above and/or other components not shown. Platform 1510 can be coupled to a network 1594 through network interface 1540 to allow for communications with other computing devices, platforms or resources. Other componentry and functionality not reflected in the block diagram of FIG. 15 will be apparent in light of this disclosure, and it will be appreciated that other embodiments are not limited to any particular hardware configuration.

Processor 1520 can be any suitable processor, and may include one or more coprocessors or controllers, such as an audio processor or a graphics processing unit, to assist in control and processing operations associated with system 1500. In some embodiments, the processor 1520 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1520 may be implemented as a complex instruction set computer (CISC) or a reduced instruction set computer (RISC) processor. In some embodiments, processor 1520 may be configured as an x86 instruction set compatible processor.

Memory 1530 can be implemented using any suitable type of digital storage including, for example, flash memory and/or random access memory (RAM). In some embodiments, the memory 1530 may include various layers of memory hierarchy and/or memory caches as are known to those of skill in the art. Memory 1530 may be implemented as a volatile memory device such as, but not limited to, a RAM, dynamic RAM (DRAM), or static RAM (SRAM) device. Storage system 1570 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1570 may comprise technology to increase the storage performance enhanced protection for valuable digital media when multiple hard drives are included.

Processor 1520 may be configured to execute an Operating System (OS) 1580 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1500, and therefore may also be implemented using any suitable existing or subsequently-developed platform.

Network interface circuit 1540 can be any appropriate network chip or chipset which allows for wired and/or wireless connection between other components of computer system 1500 and/or network 1594, thereby enabling system 1500 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1550 may be configured to interface between various I/O devices and other components of computer system 1500. I/O devices may include, but not be limited to a depth camera 110, a display element 112, a user interface 1560, and other devices not shown such as a keyboard, mouse, microphone, speaker, etc.

I/O system 1550 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1520 or any chipset of platform 1510. In some embodiments, display element 112 may comprise any television type monitor or display. Display element 112 may comprise, for example, a computer display screen, touchscreen display, video monitor, television-like device, and/or a television. Display element 112 may be digital and/or analog. Under the control of the OS 1580 (or one or more software applications), platform 1510 may display images on display element 112. The images may be provided by depth camera 110 and processed in accordance with 3D scene reconstruction results, as described herein.

It will be appreciated that in some embodiments, the various components of the system 1500 may be combined or integrated in a system-on-a-chip (SoC) architecture. In some embodiments, the components may be hardware components, firmware components, software components or any suitable combination of hardware, firmware or software.

3D scene reconstruction system 130 is configured to perform context-based 3D scene reconstruction, for example, through fusion of multiple instances of an object within the scene. Such context-based reconstruction provides a more complete and accurate representation of detected objects within the scene. 3D scene reconstruction system 130 may include any or all of the components illustrated in FIGS. 2, 4, 6, 8, 10, and 12, as described above. 3D scene reconstruction system 130 can be implemented or otherwise used in conjunction with a variety of suitable software and/or hardware that is coupled to or that otherwise forms a part of platform 1510. 3D scene reconstruction system 130 can additionally or alternatively be implemented or otherwise used in conjunction with user I/O devices that are capable of providing information to, and receiving information and commands from, a user. These I/O devices may include display element 112, and other devices collectively referred to as user interface 1560. In some embodiments, user interface 1560 may include a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, 3D scene reconstruction system 130 may be installed local to system 1500, as shown in the example embodiment of FIG. 15. Alternatively, system 1500 can be implemented in a client-server arrangement wherein at least some functionality associated with these circuits is provided to system 1500 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1594 or remotely coupled to network 1594 by one or more other networks and/or communication channels. In some cases access to resources on a given network or computing system may require credentials such as usernames, passwords, and/or compliance with any other suitable security mechanism.

In various embodiments, system 1500 may be implemented as a wireless system, a wired system, or a combination of both. When implemented as a wireless system, system 1500 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1500 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the 3D scene reconstruction methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1594. In other embodiments, the functionalities disclosed herein can be incorporated into other software applications, such as image analysis applications, scene understanding applications, augmented reality applications, and robotic imaging and navigation applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1500 may comprise additional, fewer, or alternative subcomponents as compared to those included in the example embodiment of FIG. 15.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for 3-Dimensional (3D) scene reconstruction. The method comprises: receiving, by a processor, a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; projecting, by the processor, the depth pixels into points in a global coordinate system based on the camera pose; accumulating, by the processor, the projected points into a 3D reconstruction of the scene; detecting, by the processor, objects for each 3D image frame, based on the camera pose, the 3D reconstruction, the RGB image frame and the depth map frame; classifying, by the processor, the detected objects into one or more object classes; grouping, by the processor, a plurality of instances of objects in one of the object classes based on a measure of similarity of features between the object instances; and combining, by the processor, point clouds associated with each of the grouped object instances to generate a fused object.

Example 2 includes the subject matter of Example 1, wherein the grouping further comprises: detecting features associated with surfaces of each object instance; applying feature descriptors to the detected features; matching descriptors between the object instances; and pairing a first object instance with a second object instance, the first and second object instances associated with the greatest number of descriptor matches.

Example 3 includes the subject matter of Examples 1 or 2, wherein the features are 3D features and the 3D features comprise at least one of surface variation, results of application of a min-max operator on panoramic range-images, or results of application of a 3D Harris detector.

Example 4 includes the subject matter of any of Examples 1-3, wherein the features are 2D features and the 2D features comprise at least one of Harris corners or results of application of a Scale Invariant Feature Transform.

Example 5 includes the subject matter of any of Examples 1-4, wherein the feature descriptors comprise at least one of Spin-Images, 3D Speeded-Up Robust Feature descriptors, Point Feature Histograms, or a Histogram of Oriented Gradients.

Example 6 includes the subject matter of any of Examples 1-5, further comprising: registering the paired object instances by computing a rigid transformation to map shared regions between the paired object instances; and validating the registration of the paired object instances by calculating a distance between the matched descriptors of the paired object instances and comparing the distance to a threshold value.

Example 7 includes the subject matter of any of Examples 1-6, further comprising generating an updated 3D reconstruction of the scene based on the fused objects.

Example 8 includes the subject matter of any of Examples 1-7, further comprising: segmenting each of the objects in the scene, the segmented objects comprising the points of the 3D reconstruction corresponding to contours of the associated object; and registering the fused objects to a 3D model of the associated fused object to determine an alignment of the fused object in the scene.

Example 9 is an electronic system for 3-Dimensional (3D) scene reconstruction. The system comprises: a 3D reconstruction circuit to receive a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; the 3D reconstruction circuit further to project the depth pixels into points in a global coordinate system based on the camera pose and accumulate the projected points into a 3D reconstruction of the scene; an object detection circuit to detect objects for each 3D image frame, based on the camera pose, the 3D reconstruction, the RGB image frame and the depth map frame; an object recognition circuit to classify the detected objects into one or more object classes; and a context based fusion circuit to group a plurality of instances of objects in one of the object classes based on a measure of similarity of features between the object instances and to combine point clouds associated with each of the grouped object instances to generate a fused object.

Example 10 includes the subject matter of Example 9, further comprising: a feature detection circuit to detect features associated with surfaces of each object instance; a feature descriptor application circuit to apply feature descriptors to the detected features; a descriptor matching circuit to match descriptors between the object instances; and an instance pairing circuit to pair a first object instance with a second object instance, the first and second object instances associated with the greatest number of descriptor matches.

Example 11 includes the subject matter of Examples 9 or 10, wherein the features are 3D features and the 3D features comprise at least one of surface variation, results of application of a min-max operator on panoramic range-images, or results of application of a 3D Harris detector.

Example 12 includes the subject matter of any of Examples 9-11, wherein the features are 2D features and the 2D features comprise at least one of Harris corners or results of application of a Scale Invariant Feature Transform.

Example 13 includes the subject matter of any of Examples 9-12, wherein the feature descriptors comprise at least one of Spin-Images, 3D Speeded-Up Robust Feature descriptors, Point Feature Histograms, or a Histogram of Oriented Gradients.

Example 14 includes the subject matter of any of Examples 9-13, further comprising: an instance registration circuit to register the paired object instances by computing a rigid transformation to map shared regions between the paired object instances; and a registration confirmation circuit to validate the registration of the paired object instances by calculating a distance between the matched descriptors of the paired object instances and comparing the distance to a threshold value.

Example 15 includes the subject matter of any of Examples 9-14, wherein the 3D reconstruction circuit is further to generate an updated 3D reconstruction of the scene based on the fused objects.

Example 16 includes the subject matter of any of Examples 9-15, further comprising: a 3D segmentation circuit to segment each of the objects in the scene, the segmented objects comprising the points of the 3D reconstruction corresponding to contours of the associated object; and a 3D registration circuit to register the fused objects to a 3D model of the associated fused object to determine an alignment of the fused object in the scene.

Example 17 is at least one non-transitory computer readable storage medium having instructions encoded thereon that, when executed by one or more processors, result in the following operations for 3-Dimensional (3D) scene reconstruction. The operations comprise: receiving a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; projecting the depth pixels into points in a global coordinate system based on the camera pose; accumulating the projected points into a 3D reconstruction of the scene; detecting objects for each 3D image frame, based on the camera pose, the 3D reconstruction, the RGB image frame and the depth map frame; classifying the detected objects into one or more object classes; grouping a plurality of instances of objects in one of the object classes based on a measure of similarity of features between the object instances; and combining point clouds associated with each of the grouped object instances to generate a fused object.

Example 18 includes the subject matter of Example 17, wherein the grouping operation further comprises: detecting features associated with surfaces of each object instance; applying feature descriptors to the detected features; matching descriptors between the object instances; and pairing a first object instance with a second object instance, the first and second object instances associated with the greatest number of descriptor matches.

Example 19 includes the subject matter of Examples 17 or 18, wherein the features are 3D features and the 3D features comprise at least one of surface variation, results of application of a min-max operator on panoramic range-images, or results of application of a 3D Harris detector.

Example 20 includes the subject matter of any of Examples 17-19, wherein the features are 2D features and the 2D features comprise at least one of Harris corners or results of application of a Scale Invariant Feature Transform.

Example 21 includes the subject matter of any of Examples 17-20, wherein the feature descriptors comprise at least one of Spin-Images, 3D Speeded-Up Robust Feature descriptors, Point Feature Histograms, or a Histogram of Oriented Gradients.

Example 22 includes the subject matter of any of Examples 17-21, the operations further comprising: registering the paired object instances by computing a rigid transformation to map shared regions between the paired object instances; and validating the registration of the paired object instances by calculating a distance between the matched descriptors of the paired object instances and comparing the distance to a threshold value.

Example 23 includes the subject matter of any of Examples 17-22, the operations further comprising generating an updated 3D reconstruction of the scene based on the fused objects.

Example 24 includes the subject matter of any of Examples 17-23, the operations further comprising: segmenting each of the objects in the scene, the segmented objects comprising the points of the 3D reconstruction corresponding to contours of the associated object; and registering the fused objects to a 3D model of the associated fused object to determine an alignment of the fused object in the scene.

Example 25 is a system for 3-Dimensional (3D) scene reconstruction. The system comprises: means for receiving a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; means for projecting the depth pixels into points in a global coordinate system based on the camera pose; means for accumulating the projected points into a 3D reconstruction of the scene; means for detecting objects for each 3D image frame, based on the camera pose, the 3D reconstruction, the RGB image frame and the depth map frame; means for classifying the detected objects into one or more object classes; means for grouping a plurality of instances of objects in one of the object classes based on a measure of similarity of features between the object instances; and means for combining point clouds associated with each of the grouped object instances to generate a fused object.

Example 26 includes the subject matter of Example 25, wherein the grouping further comprises: means for detecting features associated with surfaces of each object instance; means for applying feature descriptors to the detected features; means for matching descriptors between the object instances; and means for pairing a first object instance with a second object instance, the first and second object instances associated with the greatest number of descriptor matches.

Example 27 includes the subject matter of Examples 25 or 26, wherein the features are 3D features and the 3D features comprise at least one of surface variation, results of application of a min-max operator on panoramic range-images, or results of application of a 3D Harris detector.

Example 28 includes the subject matter of any of Examples 25-27, wherein the features are 2D features and the 2D features comprise at least one of Harris corners or results of application of a Scale Invariant Feature Transform.

Example 29 includes the subject matter of any of Examples 25-28, wherein the feature descriptors comprise at least one of Spin-Images, 3D Speeded-Up Robust Feature descriptors, Point Feature Histograms, or a Histogram of Oriented Gradients.

Example 30 includes the subject matter of any of Examples 25-29, further comprising: means for registering the paired object instances by computing a rigid transformation to map shared regions between the paired object instances; and means for validating the registration of the paired object instances by calculating a distance between the matched descriptors of the paired object instances and comparing the distance to a threshold value.

Example 31 includes the subject matter of any of Examples 25-30, further comprising means for generating an updated 3D reconstruction of the scene based on the fused objects.

Example 32 includes the subject matter of any of Examples 25-31, further comprising: means for segmenting each of the objects in the scene, the segmented objects comprising the points of the 3D reconstruction corresponding to contours of the associated object; and means for registering the fused objects to a 3D model of the associated fused object to determine an alignment of the fused object in the scene.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for 3-Dimensional (3D) scene reconstruction, the method comprising:
    receiving, by a processor, a plurality of 3D image frames of a scene, each frame comprising a red-green-blue (RGB) image frame comprising color pixels and a depth map frame, the depth map frame comprising depth pixels, wherein each of the 3D image frames is associated with a pose of a depth camera that generated the 3D image frames;
    projecting, by the processor, the depth pixels into points in a global coordinate system based on the camera pose;
    accumulating, by the processor, the projected points into a 3D reconstruction of the scene;
    detecting, by the processor, objects for each 3D image frame, based on the camera pose, the 3D reconstruction, the RGB image frame and the depth map frame;
    classifying, by the processor, the detected objects into one or more object classes;
    grouping, by the processor, a plurality of instances of objects in one of the object classes based on a measure of similarity of features between the object instances, wherein the grouping comprises
        detecting features associated with surfaces of each of first and second object instances,
        applying feature descriptors to the detected features,
        matching descriptors between the first and second object instances, and
        pairing the first object instance with the second object instance, the first and second object instances associated with a greatest number of descriptor matches;

validating the paired object instances by calculating a distance between the matched descriptors of the paired object instances and comparing the distance to a threshold value; and combining, by the processor, point clouds associated with each of the first and second object instances to generate a fused object.

2. The method of claim 1, wherein the features are 3D features and the 3D features comprise at least one of surface variation, results of application of a min-max operator on panoramic range-images, or results of application of a 3D Harris detector.

3. The method of claim 1, wherein the features are 2D features and the 2D features comprise at least one of Harris corners or results of application of a Scale Invariant Feature Transform.

4. The method of claim 1, wherein the feature descriptors comprise at least one of Spin-Images, 3D Speeded-Up Robust Feature descriptors, Point Feature Histograms, or a Histogram of Oriented Gradients.

5. The method of claim 1, further comprising:
registering the paired object instances by computing a rigid transformation to map shared regions between the paired object instances;
wherein validating the paired object instances includes validating the registration of the paired object instances by calculating the distance between the matched descriptors of the paired object instances and comparing the distance to the threshold value.

6. The method of claim 1, further comprising generating an updated 3D reconstruction of the scene based on the fused object.

7. The method of claim 6, further comprising:
segmenting first and second objects in the scene, the segmented objects comprising the points of the 3D reconstruction corresponding to contours of the associated object; and
registering the fused objects to a 3D model of the associated fused object to determine an alignment of the fused object in the scene.

8. An electronic system for 3-Dimensional (3D) scene reconstruction, the system comprising:
a 3D reconstruction circuit to receive a plurality of 3D image frames of a scene, each frame comprising a red-green-blue (RGB) image frame comprising color pixels and a depth map frame, the depth map frame comprising depth pixels, wherein each of the 3D image frames is associated with a pose of a depth camera that generated the 3D image frames,
the 3D reconstruction circuit further to project the depth pixels into points in a global coordinate system based on the camera pose and accumulate the projected points into a 3D reconstruction of the scene;
an object detection circuit to detect objects for each 3D image frame, based on the camera pose, the 3D reconstruction, the RGB image frame and the depth map frame;
an object recognition circuit to classify the detected objects into one or more object classes;
a feature detection circuit to detect features associated with surfaces of each of first and second object instances;
a feature descriptor application circuit to apply feature descriptors to the detected features;
a descriptor matching circuit to match descriptors between the first and second object instances;
an instance pairing circuit to pair the first object instance with the second object instance, the first and second object instances associated with the greatest number of descriptor matches;
an instance registration circuit to register the paired object instances by computing a rigid transformation to map shared regions between the paired object instances;
a registration confirmation circuit to validate the registration of the paired object instances by calculating a distance between the matched descriptors of the paired object instances and comparing the distance to a threshold value; and
a context based fusion circuit to group a plurality of instances of objects in one of the object classes based on a measure of similarity of features between the object instances and to combine point clouds associated with each of the first and second object instances to generate a fused object.

9. The system of claim 8, wherein the features are 3D features and the 3D features comprise at least one of surface variation, results of application of a min-max operator on panoramic range-images, or results of application of a 3D Harris detector.

10. The system of claim 8, wherein the features are 2D features and the 2D features comprise at least one of Harris corners or results of application of a Scale Invariant Feature Transform.

11. The system of claim 8, wherein the feature descriptors comprise at least one of Spin-Images, 3D Speeded-Up Robust Feature descriptors, Point Feature Histograms, or a Histogram of Oriented Gradients.

12. The system of claim 8, wherein the 3D reconstruction circuit is further to generate an updated 3D reconstruction of the scene based on the fused object.

13. The system of claim 12, further comprising:
a 3D segmentation circuit to segment first and second objects in the scene, the segmented objects comprising the points of the 3D reconstruction corresponding to contours of the associated object; and
a 3D registration circuit to register the fused objects to a 3D model of the associated fused object to determine an alignment of the fused object in the scene.

14. At least one non-transitory computer readable storage medium having instructions encoded thereon that, when executed by one or more processors, result in the following operations for 3-Dimensional (3D) scene reconstruction, the operations comprising:
receiving a plurality of 3D image frames of a scene, each frame comprising a red-green-blue (RGB) image frame comprising color pixels and a depth map frame, the depth map frame comprising depth pixels, wherein each of the 3D image frames is associated with a pose of a depth camera that generated the 3D image frames;
projecting the depth pixels into points in a global coordinate system based on the camera pose;
accumulating the projected points into a 3D reconstruction of the scene;
detecting objects for each 3D image frame, based on the camera pose, the 3D reconstruction, the RGB image frame and the depth map frame;
classifying the detected objects into one or more object classes;
grouping a plurality of instances of objects in one of the object classes based on a measure of similarity of features between the object instances, wherein the grouping comprises detecting features associated with surfaces of each of first and second object instances, applying feature descriptors to the detected features, matching descriptors between the first and second object instances, and pairing the first object instance with the second object instance, the first and second object instances associated with a greatest number of descriptor matches;

validating the paired object instances by calculating a distance between the matched descriptors of the paired object instances and comparing the distance to a threshold value; and combining point clouds associated with each of the first and second object instances to generate a fused object.

15. The computer readable storage medium of claim 14, wherein the features are 3D features and the 3D features comprise at least one of surface variation, results of application of a min-max operator on panoramic range-images, or results of application of a 3D Harris detector.

16. The computer readable storage medium of claim 14, wherein the features are 2D features and the 2D features comprise at least one of Harris corners or results of application of a Scale Invariant Feature Transform.

17. The computer readable storage medium of claim 14, wherein the feature descriptors comprise at least one of Spin-Images, 3D Speeded-Up Robust Feature descriptors, Point Feature Histograms, or a Histogram of Oriented Gradients.

18. The computer readable storage medium of claim 14, the operations further comprising:

registering the paired object instances by computing a rigid transformation to map shared regions between the paired object instances;

wherein validating the paired object instances includes validating the registration of the paired object instances by calculating the distance between the matched descriptors of the paired object instances and comparing the distance to the threshold value.

19. The computer readable storage medium of claim 14, the operations further comprising generating an updated 3D reconstruction of the scene based on the fused object.

20. The computer readable storage medium of claim 19, the operations further comprising:

segmenting first and second objects in the scene, the segmented objects comprising the points of the 3D reconstruction corresponding to contours of the associated object; and registering the fused objects to a 3D model of the associated fused object to determine an alignment of the fused object in the scene.

* * * * *